United States Patent [19]

Olmsted

[11] Patent Number: 4,515,032
[45] Date of Patent: May 7, 1985

[54] DROP-IN TYPE SHIFTER WITH DISPLACED SHIFT STICK

[75] Inventor: Bruce E. Olmsted, Fruitport, Mich.

[73] Assignee: JSJ Corporation, Grand Haven, Mich.

[21] Appl. No.: 429,516

[22] Filed: Sep. 30, 1982

[51] Int. Cl.³ .................. B60K 20/04; G05G 13/00; C07C 107/08
[52] U.S. Cl. .................. 74/473 R; 74/475; 267/150
[58] Field of Search .............. 74/473 R, 475, 473 P, 74/527; 267/150

[56] References Cited

U.S. PATENT DOCUMENTS

| | | | |
|---|---|---|---|
| 3,054,302 | 9/1962 | Cone | 74/475 |
| 3,417,634 | 12/1968 | Dangauthier | 74/473 R |
| 3,500,697 | 3/1970 | Schowalter | 74/475 |
| 3,601,230 | 8/1971 | Platz | 74/527 X |
| 3,645,135 | 2/1972 | Galas | 74/473 R |
| 4,348,915 | 9/1982 | Leitermann et al. | 74/473 R |
| 4,445,393 | 5/1984 | Braun | 74/473 R X |

Primary Examiner—Allan D. Herrmann
Assistant Examiner—Stephen B. Andrews
Attorney, Agent, or Firm—Price, Heneveld, Huizenga & Cooper

[57] ABSTRACT

A drop-in shifter for a manual transmission includes an elongated base, a shift stick mounted on the base for multi-axis movement and a depending gear actuating lever. An elongated rail is supported on the base by spaced bearings for rotational and lateral shifting movement. The shift stick has a lower end pivoted to the rail. The gear actuating lever is fixed to the rail at a point spaced from the shift stick. The lever extends through the base which is bolted to the transmission. Multi-axis movement of the shift stick is translated into multi-axis movement of the gear actuating lever through the bearings and rail.

24 Claims, 3 Drawing Figures

DROP-IN TYPE SHIFTER WITH DISPLACED SHIFT STICK

BACKGROUND OF THE INVENTION

The present invention relates to vehicle transmission shifters and more particularly to a manual drop-in type shifter.

Different forms of manual transmission shifting devices are presently available. For example, the remote, floor pan mounted type shifter transmits shift lever motion to shift linkage in the transmission through cables or elongated links. Other types include the transmission mounted shifter, the column mounted shifter and the drop-in type shifter. The transmission mounted shifters typically are bolted to the side of the transmission and include ears which are connected to the shifting mechanism of the transmission. Drop-in type shifters are mounted to the top of the transmission at an aperture. Typical drop-in shifters include a base, a shift stick pivotally mounted on the base, and a gear actuating lever extending downwardly from the base and joined to the shift stick. The base is secured at an aperture on the top of the transmission. The gear actuating lever extends downwardly from the base through the aperture and into the transmission. Fore and aft and lateral movement of the gear actuating lever causes changes in the drive ratio of the transmission when the shift stick is pivoted.

With drop-in type shifters, the shift stick extends vertically through the floor pan generally from the centerline of the transmission. In certain vehicle applications, probems are presented by such an arrangement. For example, in vans with a manual transmission extending along the vehicle centerline, drop-in type shifters place the shift stick in the middle of the vehicle between the driver and passenger seat. This location restricts access between the front and rear of the vehicle. The shift stick obstructs the passage or walk area between the front seats. A need exists for a shifter mechanism which will have the assembly advantages of the drop-in type shifter yet which provides free passage between spaced driver and passenger seats and which positions the shift stick adjacent the operator seat.

SUMMARY OF THE INVENTION

In accordance with the present invention, a drop-in shifter is provided by which the aforementioned needs are fulfilled. Essentially, the shifter includes an elongated frame or base which is adapted to be secured to the top of the vehicle transmission. A manually actuable shift stick is supported on the base for lateral and fore and aft pivotal motion. An elongated rail or bar is supported on the base. The shift stick is connected to the rail. Provision is made for supporting the rail on the base for rotation about its longitudinal axis and for lateral shifting movement relative to the vehicle centerline. Secured to the elongated rail at a point spaced from the shift stick is a depending gear actuating lever. When mounted on the vehicle transmission, the gear actuating lever extends through an aperture in the top of the transmission and contacts the gear ratio changing mechanism thereof.

The mechanism in accordance with the present invention translates fore and aft and lateral movement of the shift stick to fore and aft and lateral movement of the depending gear actuating lever. The present invention positions the shift stick offset from the vehicle centerline or the transmission centerline. This results in a clear path between the front and rear of the vehicle. The shift stick is conveniently positioned adjacent the vehicle operator.

DETAILED DESCRIPTION OF THE PREFERRED EMBODIMENT

Figure 1:
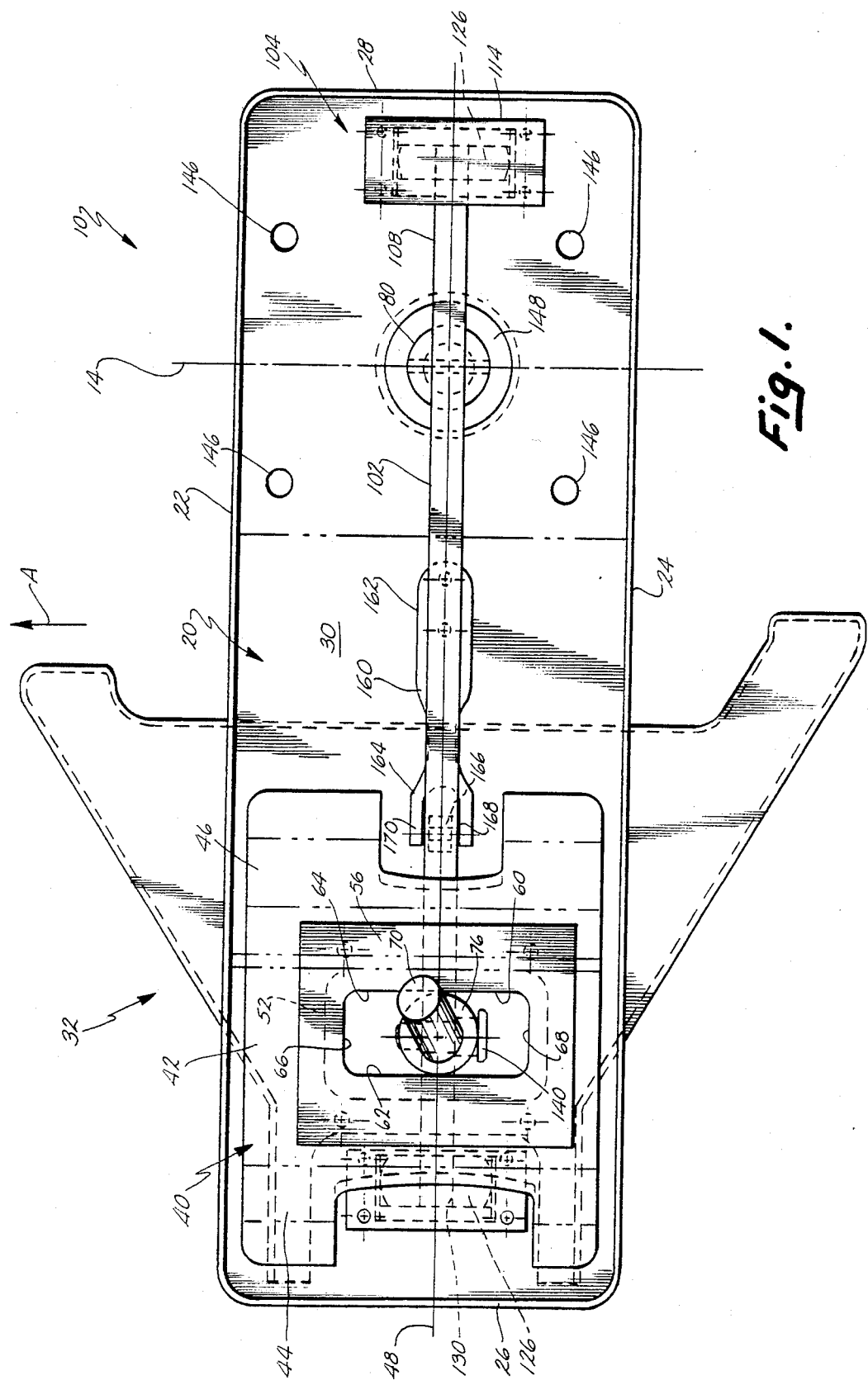
FIG. 1 is a top, plan view of a shifter mechanism in accordance with the present invention.
Figure 2:
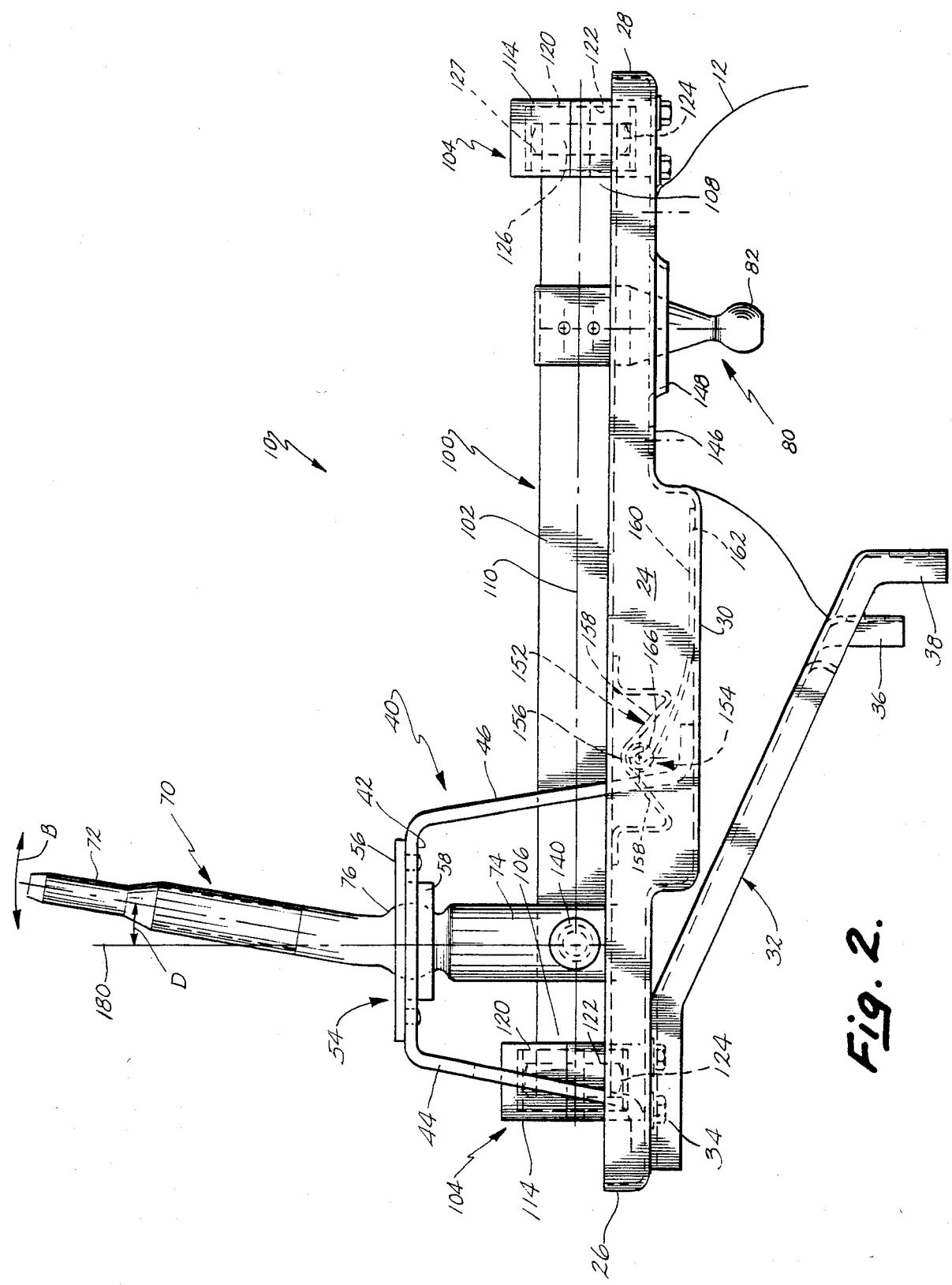
FIG. 2 is a rear, elevational view of the shifter mechanism.
Figure 3:
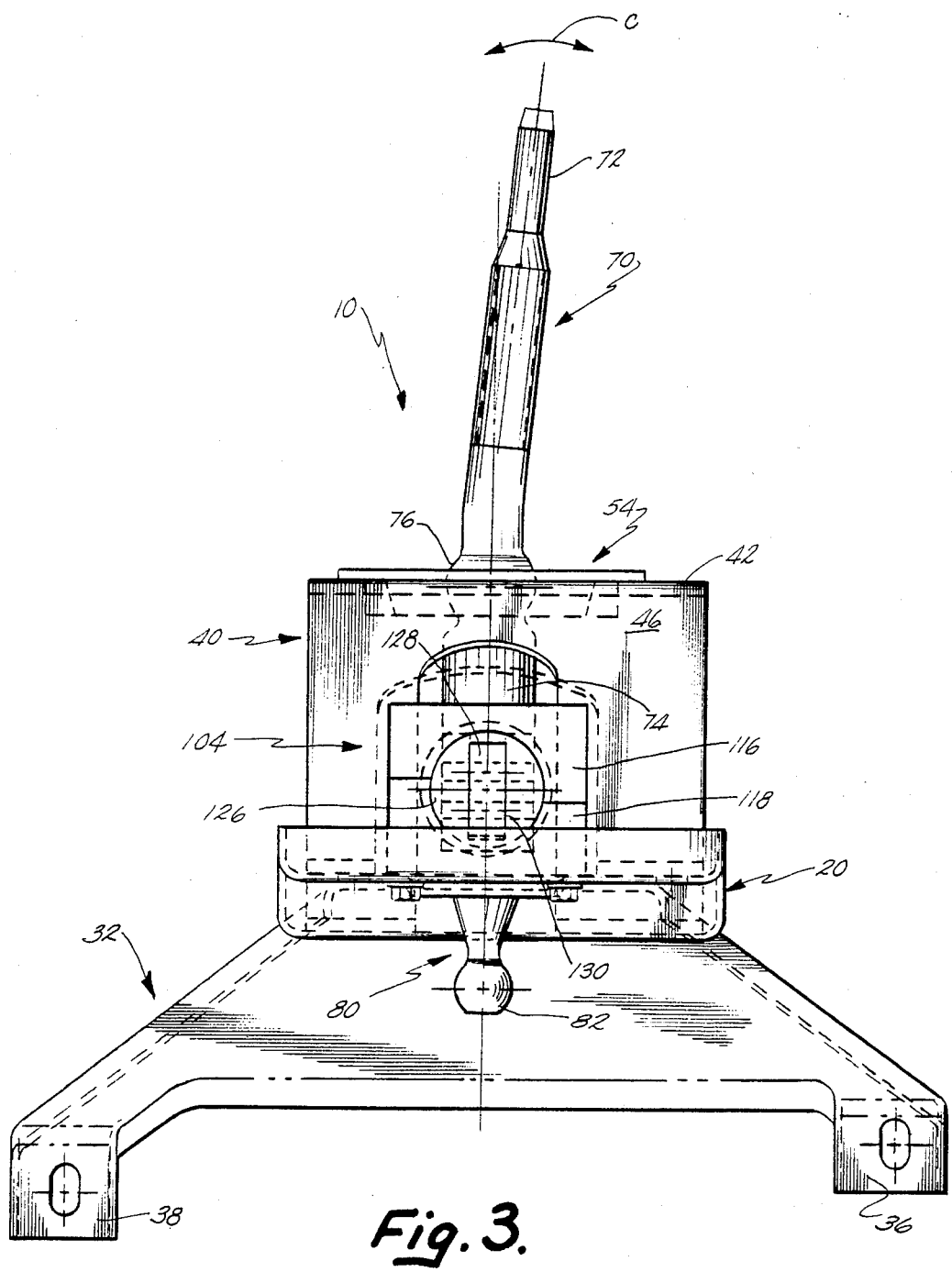
FIG. 3 is a right-hand elevational view of the shifter mechanism of FIG. 2.

A drop-in type shifter in accordance with the present invention is illustrated in FIGS. 1, 2 and 3 and generally designated 10. As schematically illustrated in FIG. 2, shifter 10 is adapted to be bolted to the top of a transmission 12. The longitudinal centerline of the transmission is designated 14 in FIG. 1. Arrow A points towards the front of the vehicle along this centerline. Shifter 10 is primarily adapted for use in vans, trucks and the like wherein the transmission extends along the vehicle centerline in a fore and aft direction. Device 10 moves a shift stick to a point offset from the vehicle centerline adjacent the operator's seat. Clear passage between the front and the back compartments of the vehicle is provided.

Shifter 10 includes an elongated base or frame 20. Base 20 has a generally pan-shaped configuration. Base 20 includes spaced lateral walls 22, 24, an end wall 26, an end wall 28 and a bottom 30. Secured to the undersurface of bottom 30 of base 20 is a bracket 32. Bracket 32, as seen in FIG. 2, includes an end 34 bolted or otherwise secured to bottom 30 and mounting ears 36, 38. The bracket is bolted to the side of transmission 12 at ears 36, 38.

Welded or otherwise suitably secured to the upper surface of bottom 30 of base 20 is a tower structure generally designated 40. Tower structure 40 is generally U-shaped in configuration and includes a base 42 and legs 44, 46. Tower 40 extends along the longitudinal axis 48 of base 20. Base 42 of tower 40 defines an elongated, generally rectangular slot 52. Slot 52 extends transversely of lateral or longitudinal axis 48 or in a fore and aft direction relative to the vehicle and parallel to centerline 14. Disposed within slot 52 is a guide structure 54. As seen in FIG. 2, guide 54 includes a peripheral flange 56 and a central block-like portion 58. Portion 58 defines an elongated slot 60. Slot 60 has elongated sidewalls 62, 64 and ends 66, 68.

Supported on base 20 and extending through slot 60 is an elongated shift stick 70. Shift stick 70 includes an upper manually shiftable portion 72 and a lower portion 74. Stick 70 is formed with an intermediate spherical or ball-like portion 76. Portion 76 contacts walls 62, 64 of slot 60. The sidewalls of slot 60 define fulcrum or pivot points in engagement with ball 76. Shift stick 70, therefore, may be pivoted in a lateral direction with respect to the vehicle centerline as indicated by the double arrow line B in FIG. 2. Also, shift stick 70 may be shifted in a fore and aft direction with respect to the vehicle centerline within the elongated slot 60 as indicated by the double arrow line C in FIG. 3. Tower 40 defines a guide and pivot structure for multi-axis movement of shift stick 70 within two orthogonal planes.

Multi-axis movement of shift stick 70 is translated to multi-axis movement of a gear actuating lever generally designated 80. Gear actuating lever 80 includes a lower ball end portion 82 which extends into transmission 12. Fore and aft and lateral movement of lever 80 engages the shifting mechanism (not shown) of the transmission 12 to change the transmission drive ratio.

The means for translating movement of shifter 70 to movement of gear actuating lever 80 is positioned on base 20 and generally designated 100. Means 100 includes an elongated rail or bar 102 and a pair of spaced bearings 104. Rail 102 defines a longitudinal axis 110. An end 106 and an end 108 of rail 102 are supported within rotational and slide bearings 104. Each bearing 104 includes a two-part housing structure 114. Housing 114 includes an upper portion 116 and a lower portion 118. Portions 116, 118 define semicircular recesses or grooves 120, 122. The grooves define an internal hub structure. A liner 124 is positioned around the inner peripheral surface of recesses 120, 122. Housing 114 in effect defines a cylinder.

Disposed within housing 114 is a piston or generally circular disc 126. Disc 126 includes an outer peripheral surface 127 which engages the wear liner 124. Outer peripheral surface 127 has a radius between the faces of the piston. The piston is, in effect a section of a sphere. Piston 126 may rotate within housing 114 about its center point 128 (FIG. 3). Center 128 is coincident with longitudinal axis 110 of rail 102. Each piston 126 defines an elongated slot 130 (FIG. 3). The ends of the rail 102 are press-fitted into slots 130 in each of the pistons.

As shown in FIGS. 1 and 2, pistons 126 and hence the ends of the rail 106, 108 may shift laterally of the vehicle centerline or along the longitudinal axis 48 of base 20 within bearing housings or the bearing blocks 114. The rotational movement and the lateral shifting or sliding movement of rail 102 translates multi-axis movement of shift stick 70 into multi-axis movement of gear actuating lever 80.

Lower end 74 of shift stick 70 is pinned or pivotally connected to rail 102 by a pivot pin 140. Gear actuating lever 80 is bolted to rail 70 at a point spaced from end 74 along axis 110. As seen in FIGS. 2 and 3, lower end 74 is preferably bifurcated and pivot pin 140 extends through the rail and end 74 of stick 70. Lateral pivotal movement of stick 70 translates into shifting movement of rail 102 along longitudinal axis 48. Fore and aft shifting movement of shift stick 70 within slot 60 causes rotation of rail 102 about its longitudinal axis 110. This results in fore and aft pivotal movement of gear actuating lever 80.

Base 20 is bolted to the top of transmission 12 by bolts extending through bolt holes 146 defined by bottom 30. Gear actuating lever 80 extends through a generally circular aperture 148 formed in the base structure.

Provision is made for biasing the shift stick 70 into a neutral position. As seen in FIGS. 1 and 2, an inverted, generally V-shaped bracket 152 is secured to the undersurface of rail 102. Bracket 152 defines a V-shaped slot 154 having an apex 156 and legs 158. A curved leaf spring 160 has an end 162 secured to base 20. A free end 164 of spring 160 is bifurcated and supports a roller 166. Roller 166 is rotatably mounted on a pin or axle 168 captured by legs 170 of spring 160. In the neutral position, roller 166 is disposed within the apex 156 of bracket 152. As rail 102 is shifted to the right or to the left, when viewed in FIG. 2, or in a lateral direction with respect to centerline 14, roller 166 engages legs 158 of bracket 152. Spring 150 biases rod 102 to the neutral position since spring 160 generates a force against the side legs 158 of bracket 152. This force tends to return rail 102 to the position shown in FIG. 2.

It is presently preferred that base 20, tower 40 and bracket 152 be stamped from sheet metal. Shift stick 70 and gear actuating lever 80 are formed from steel. Housing halves 116, 118 of block 114 are fabricated from a plastic material such as a glass-filled nylon. Liner 120 is preferably a metal or steel sleeve liner. It is further presently preferred that each piston 126 be fabricated from a glass-filled nylon. The curvature or radius from the front to back of each piston 126 accommodates misalignment within the housing. This reduces manufacturing tolerances, thereby simplifying manufacture and assembly. It is preferred that guide block 54 be fabricated from a glass-filled nylon material. Nylon material has the required strength and possess self-lubricating properties and acceptable wear characteristics.

OPERATION

In operation, assembly 10 is bolted to transmission 12 by bolts passing through bolt holes 146 in the base of pan 20. Mounting lugs 36, 38 are also bolted to the side of transmission 12. Gear actuating lever 80 drops into transmission 12 through an aperture in the top of the transmission. Device 10 offsets the gear shift lever 70 from the vehicle or transmission centerline 14. In the typical van installation, shift stick 70 would be positioned immediately adjacent or even under the operator's seat. A suitable shift extension is threaded or otherwise secured to upper end 72 of shift stick 70. As shown in the drawings, the upper end 72 of stick 70 extends at an angle D from a vertical line 180. The shift stick extension would also be bent to position an upper shift knob adjacent the operator.

Pivotal movement of stick 70 within slot 60 causes fore and aft pivotal movement of lever 80. Pistons 126 rotate within housings and rail 102 rotates or pivots about its longitudinal axis. Pivotal movement of stick 70 in a lateral plane about sides 62, 64 of slot 60 cause sliding movement of pistons 126 within their housings. Rail 102 shifts along axis 48 of base 20 and lever 80 shifts laterally of transmission centerline 14. The relative movements of stick 70 and lever 80 are opposite. That is, forward movement of stick 70 translates to rearward movement of lever 80 and so forth.

Mechanism 10 is usable with any shift pattern which is dependent upon the type of transmission 12. For example, the standard 4-speed H pattern, 3-speed pattern or 5-speed pattern could be accommodated by the mechanism. The structure translates multi-axis movement of shift stick 70 into multi-axis movement of the gear actuating lever 80. Tower 40 and guide block 52 provide a feel to the manual transmission. A point-to-point contact is provided between ball portion 76 of shift stick 70 and sidewalls 62, 64 of slot 60 for lateral pivotal movement of the shift stick. Drop-in shifter 10 is relatively easily and inexpensively manufactured employing conventional materials. While illustrated as positioning the shift stick offset laterally with respect to the vehicle centerline, the present invention could be used to position the shift stick either in a fore and aft direction or fore and aft and laterally from the vehicle centerline. This is merely dependent upon the position at which base 20 is bolted to the transmission and the configuration of rail 102. Also, when installed on the transmission, a plastic cover could be placed over shifter 10 to keep dirt off the moving parts.

In view of the foregoing description, those of ordinary skill in the art will undoubtedly envision various modifications to the present invention which would not depart from the inventive concepts disclosed herein. For example, rail 102 could be rectangular or circular in cross section and/or the rail could have offset portions. The primary consideration is to provide a link between a lower end of a shift stick and an offset or spaced gear actuating lever. Therefore, it is expressly intended that the above description should be considered as only that of the preferred embodiment. The true spirit and scope of the present invention may be determined by reference to the appended claims.

The embodiments of the invention in which an exclusive property or privilege is claimed are defined as follows:

1. A drop-in shifter for use with a manual transmission and which is primarily adapted to position a stick offset from a vehicle longitudinal centerline and adjacent an operator, said shifter comprising:
   an elongated base;
   bracket means joined to said base for mounting the base on a transmission housing;
   a shift stick;
   tower means extending from said base for defining an elongated slot having spaced sides and ends, said shift stick including a ball-like portion contacting said spaced sides so that the stick may be moved along said slot between said ends and pivoted about said sides of said slot;
   a gear actuating lever depending from said base and offset from said shift stick, said gear actuating lever dimensioned to drop into an aperture in the transmission housing; and
   translating means on said base and interconnecting said shift stick and said gear actuating lever for translating fore and aft and lateral movement of said shift stick into fore and aft and lateral movement of said gear actuating lever, said gear actuating lever being offset from said tower and said shift stick longitudinally along said elongated base.

2. A drop-in shifter as defined by claim 1 wherein said translating means comprises:
   an elongated rail, said gear actuating lever being secured to said rail; and
   bearing means on said base and supporting said rail for rotational and sliding movement in response to multi-axis movement of said shift stick.

3. A drop-in shifter as defined by claim 2 wherein said bearing means comprises:
   a bearing housing defining a cylindrical inner surface; and
   a piston secured to said rail and disposed within said housing and engaging said cylindrical inner surface.

4. A drop-in shifter as defined by claim 3 further including biasing means engaging said rail for biasing said rail and said shift stick to a neutral position.

5. A drop-in shifter as defined by claim 4 wherein said piston has a curved outer peripheral surface to accommodate misalignment between said piston and said cylindrical inner surface and prevent binding.

6. A drop-in shifter as defined by claim 2 wherein said bearing means comprises:
   a pair of spaced housings on said base, each housing defining a cylindrical inner peripheral surface; and
   a pair of generally circular pistons, each piston being disposed in one of said housings for rotational and sliding lateral movement, said rail extending between said pistons and said shift stick having a lower end pivoted to said rail intermediate said pistons.

7. A drop-in shifter as defined by claim 6 wherein each of said pistons defines a slot and said rail has ends extending into said slots.

8. A drop-in shifter mechanism for use with a vehicle transmission, said mechanism comprising:
   an elongated frame;
   bracket means joined to said frame for securing said frame to the vehicle transmission;
   a manually actuable shift stick having an upper end and a lower end;
   stick mounting means on said frame for mounting said shift stick to said frame for multi-axis movement in a pair of orthogonal planes, said stick mounting means allowing sliding movement of said shift stick in one plane and pivotal movement in the other plane;
   an elongated bar having a longitudinal axis, said shift stick lower end being pivotally secured to said elongated bar;
   bearing means on said frame and supporting said bar for rotational movement of said bar about said longitudinal axis and for sliding movement of said bar along said longitudinal axis upon movement of said shift stick upper end; and
   a gear actuating lever secured to said bar at a point spaced along said longitudinal axis of said bar from said shift stick lower end, said lever having a lower end including means for changing the drive ratio of the transmission, whereby said gear actuating lever may be dropped into said transmission and said shift stick may be offset from the centerline of the vehicle transmission.

9. A drop-in shifter mechanism as defined by claim 8 wherein said stick mounting means defines an elongated slot extending transversely to the longitudinal axis of said bar and wherein said shift stick defines a ball intermediate its ends which engages and is guided by said slot.

10. A drop-in shifter mechanism as defined by claim 8 wherein said bearing means comprises:
    a housing secured to said frame; and
    a generally circular disc disposed within said housing and rotatable about an axis passing through the center thereof, said disc defining a through slot and said bar having an end slidably received within said slot.

11. A drop-in shifter mechanism as defined by claim 10 wherein said bearing means further comprises:
    another housing secured to said frame in spaced tandem relationship to said housing; and
    another generally circular disc disposed within said another housing and rotatable about an axis passing through the centerline thereof, said another disc defining a through slot and said bar having another end opposite said an end received within said slot of said another disc and wherein each of said discs has a curved outer peripheral surface to accommodate misalignment between said discs and said housings.

12. A drop-in shifter mechanism as defined by claim 8 further including:

biasing means on said frame and engaging said bar for biasing said bar towards a neutral position along the longitudinal axis of said bar.

13. A drop-in shifter mechanism as defined by claim 12 wherein said biasing means comprises:
    a curved leaf spring having an end secured to said frame and a free end;
    a bracket secured to said bar and defining a generally V-shaped recess; and
    a roller secured to said spring free end and disposed within said recess.

14. A drop-in shifter mechanism as defined by claim 13 wherein said stick mounting means defines a slot extending transversely to the longitudinal axis of said bar and wherein said shift stick defines a ball intermediate its ends which engages and is guided by said slot.

15. A drop-in shifter mechanism as defined by claim 10 further including:
    biasing means on said frame and engaging said bar for biasing said bar towards a neutral position along the longitudinal axis of said bar.

16. A drop-in shifter mechanism as defined by claim 15 wherein said biasing means comprises:
    a curved leaf spring having an end secured to said frame and a free end;
    a bracket secured to said bar and defining a generally V-shaped recess; and
    a roller secured to said spring free end and disposed within said recess.

17. A drop-in shifter mechanism as defined by claim 16 wherein said bearing means further comprises:
    another housing secured to said frame in spaced tandem relationship to said housing; and
    another generally circular disc disposed within said another housing and rotatable about an axis passing through the centerline thereof, said another disc defining a through slot and said bar having another end opposite said an end received within said slot of said another disc.

18. A drop-in shifter mechanism as defined by claim 17 wherein said stick mounting means defines a slot extending transversely to the longitudinal axis of said bar and wherein said shift stick defines a ball intermediate its ends which engages and is guided by said slot.

19. A mechanism for translating multi-axis movement of a manual shift stick to multi-axis movement of a drop-in transmission shift lever, said mechanism comprising:
    an elongated frame having means defining an elongated slot for guiding the shift stick intermediate upper and lower ends of the stick for sliding movement along said slot in one plane and pivotal movement in another plane perpendicular to said one plane;
    means on said frame for securing said frame to a transmission;
    an elongated bar having ends and defining a longitudinal axis;
    pivot means for securing said stick lower end to said bar for pivotal movement about an axis transverse to the longitudinal axis of said bar; and
    a pair of bearing means longitudinally spaced on said frame for supporting said bar for longitudinal sliding movement and rotational movement so that multi-axis movement of the shift stick in said perpendicular plane is translated into longitudinal and rotational movement of said bar, said shift lever being securable to said bar at a point spaced longitudinally from said pivot means.

20. A mechanism as defined by claim 19 wherein said bearing means comprises:
    a generally circular member having a slot dimensioned to receive one of the ends of said bar; and
    a housing secured to said frame and capturing said circular member so that the member may rotate within said housing and slide along a center axis of said housing.

21. A mechanism as defined by claim 19 wherein said means for guiding said shift stick comprises:
    a tower secured to said frame and having a base, said base defining said elongated slot extending transversely to said frame, said shift stick riding within said slot.

22. A mechanism as defined by claim 19 further including:
    biasing means on said frame for biasing said bar to a neutral position.

23. A mechanism as defined by claim 22 wherein said biasing means comprises:
    a bracket secured to an under surface of said bar and defining a generally V-shaped recess having an apex and legs which extend along the longitudinal axis of the bar;
    a roller disposed within said recess and engaging said legs; and
    a spring supporting said roller and biasing said roller towards said apex.

24. A mechanism as defined by claim 23 wherein said means for guiding said shift stick comprises:
    a tower secured to said frame and having a base, said base defining a slot extending transversely to said frame, said shift stick riding within said slot.

* * * * *